United States Patent
Okamoto et al.

(10) Patent No.: US 7,012,877 B2
(45) Date of Patent: Mar. 14, 2006

(54) INFORMATION REPRODUCING APPARATUS AND METHOD, AND DRIVE CONTROL SYSTEM

(75) Inventors: Yasuhisa Okamoto, Saitama (JP); Takashi Sasaki, Saitama (JP); Shinichi Naohara, Saitama (JP); Kazunori Matsuo, Saitama (JP); Masao Yoshida, Saitama (JP); Yasuhiro Shinkai, Saitama (JP); Kenji Nakamura, Saitama (JP); Shigeru Kojima, Saitama (JP); Kenji Uchiyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 339 days.

(21) Appl. No.: 10/459,703

(22) Filed: Jun. 12, 2003

(65) Prior Publication Data
US 2003/0235123 A1 Dec. 25, 2003

(30) Foreign Application Priority Data
Jun. 13, 2002 (JP) .............................. 2002-172569

(51) Int. Cl.
*G11B 23/00* (2006.01)
*G11B 17/04* (2006.01)

(52) U.S. Cl. .............................. 369/192.1; 369/258.1; 369/270.1

(58) Field of Classification Search ..................... None
See application file for complete search history.

(56) References Cited

U.S. PATENT DOCUMENTS

| | | | | |
|---|---|---|---|---|
| 6,115,210 A | * | 9/2000 | Kakuta et al. | 360/98.01 |
| 6,134,213 A | * | 10/2000 | Suzuki et al. | 369/30.82 |
| 6,198,716 B1 | | 3/2001 | Tamiya et al. | 369/270 |
| 2001/0012260 A1 | | 8/2001 | Tamiya et al. | 369/192 |

FOREIGN PATENT DOCUMENTS

| | | |
|---|---|---|
| JP | 9-91815 | 4/1997 |
| JP | 10-162463 | 6/1998 |
| JP | 11-45492 | 2/1999 |

* cited by examiner

*Primary Examiner*—Muhammad Edun
(74) *Attorney, Agent, or Firm*—Drinker Biddle & Reath LLP (57) ABSTRACT

An information reproducing apparatus is provided with: a clamping device (900) capable of clamping and clamp-releasing a recording medium (100); a rotating device (20) for rotating the recording medium clamped by the clamping device; a reading device (30) disposed opposite to an information record surface of the recording medium for reading information recorded on the information record surface of the recording medium; a driving device (34, 34D, 32) capable of moving the reading device in a radial direction of the recording medium; and a linkage device (24, 83, 85) for linking a clamping or clamp-releasing action by the clamping device with a movement of the reading device by the driving device. The driving device moves the reading device as a first driving voltage is supplied to the driving device upon reading the information recorded on the information record surface, the first driving voltage including such a value that the action of the clamping device is not linked with the movement of the reading device by the linkage device.

10 Claims, 5 Drawing Sheets

INFORMATION REPRODUCING APPARATUS AND METHOD, AND DRIVE CONTROL SYSTEM

BACKGROUND OF THE INVENTION

1. Field of the Invention

The present invention relates to an information reproducing apparatus for and method of reproducing contents information recorded on a recording medium such as a CD (Compact Disc), an MD (Mini Disc), a DVD or the like. The present invention also relates to a drive control system suitable for controlling a driving device of an optical pickup in the information reproducing apparatus.

2. Description of the Related Art

Recently, there have been provided recording media such as CDs, MDs, DVDs and the like as well as corresponding players or reproducing apparatuses for reproducing those recording media. As a player among those, it is getting popular a type of indoor-use player for listening to music or watching a movie, or a type of on-vehicle player to be mounted and utilized on a vehicle. The latter allows the user to listen to music or watch a movie via one or more speakers provided for a conventional car audio equipment, or via a display screen provided for a car navigation system.

Particularly, DVDs are becoming dominant in these recording media, by virtue of their capability to store a great volume of contents information, such as video and/or audio information (e.g. voice and image information etc., in the volume for one whole movie.), on one disc.

Such DVDs can be reproduced, as mentioned below, by a DVD player as one example of the information reproducing apparatus. That is, a DVD is mounted on a trey, which is provided for the DVD player, and is then inserted thereinto. The DVD inserted into the player is then clamped. The clamping operation is carried out by holding an inner circumference of a circular hole formed at the center of the DVD by means of one or more clamping pawls each of which extends through the hole from one side of the DVD to the other side. Next, the clamped DVD is rotated with the rotational force generated by a spindle motor. In this case, the rotational movement is stable, because the DVD is held by the clamping pawls. During the rotational movement of the DVD, the reproduction of the DVD) can be carried out by reading information recorded on an information recorded surface of the DVD via the optical pickup disposed opposite to the information recorded surface.

Such information reproducing apparatuses involve, however, a problem as follows in the DVD clamping function during a series of operation. That is, such an operation of the clamping pawls is typically operatively linked to the movement of the optical pickup. More concretely, as the optical pickup moves inwardly in the radial direction of the DVD, the clamping pawls moves to disengage themselves from the DVD owing to the operative linkage therebetween.

This operative linkage can be realized in an arrangement of (i) a spring for applying force or pressure to the clamping pawls in a clamping direction (i.e. a direction in which the clamping pawls extend through the hole and hold the inner circumference of the hole.) and (ii) a clamping pawl actuating lever constructed so as to transmit the force generated by the movement of the optical pickup to the clamping pawls In this arrangement, the DVD clamp-releasing can be accomplished by the operative linkage in that the clamping pawls are displaced in a clamp-releasing direction (i.e. a direction wherein the clamping pawls are disengaged from the hole) against the applied force of the spring, via the clamping pawl actuating lever, by moving the optical pickup inwardly in the radial direction of the DVD. Similarly, the clamping pawls may be displaced in the clamping direction with a natural force of the spring, by moving the optical pickup outwardly in the radial direction of the DVD from the present position.

In this arrangement, however, the DVD may be disengaged because of the operative linkage between the clamping pawls and the optical pickup even during the DVD reproduction process. For instance, the DVD may be disengaged from its clamping position, as the optical pickup moves inwardly in the radial direction of the DVD during the rotational movement of the DVD in the case that the tracking error signal cannot be detected during the DVD track search due to an external disturbance such as a vibration, a scratch or flaw on the DVD surface. In this situation, it is hardly possible to maintain the stable rotation of the DVD, resulting in the secure reproduction process of the DVD being impossible.

To address this problem, there have been provided a sensor for sending a signal to immediately stop the carriage motor for driving the optical pickup if the optical pickup is ready to advance beyond the limit point. Alternatively, a similar sensor may be provided for the clamping pawl actuating lever to immediately stop the spindle motor if any unexpected motion of the clamping pawl actuating lever is detected. However, this does not provide the essential solution, because it takes a considerable time to set up again (resume) the reproduction process from the time of the emergency stop, and thereby may cause so-called "sound interruption" inconvenient to the user.

This problem is common in the disc shaped recording media such as CDs or MDs as previously mentioned as well as DVDs.

SUMMARY OF THE INVENTION

The present invention has been accomplished in view of the above problem for example. It is therefore an object of the present invention to provide an information reproducing apparatus and method, by which it is possible to perform the reproduction process securely by clamping the recording medium firmly during the reproduction, as well as a drive control system to be suitably incorporated into the information reproducing apparatus.

The above object of the present invention can be achieved by an information reproducing apparatus provided with: a clamping device capable of clamping and clamp-releasing a recording medium; a rotating device for rotating the recording medium clamped by the clamping device; a reading device disposed opposite to an information record surface of the recording medium for reading information recorded on the information record surface of the recording medium; a driving device capable of moving the reading device in a radial direction of the recording medium; and a linkage device for linking a clamping or clamp-releasing action by the clamping device with a movement of the reading device by the driving device, wherein the driving device moves the reading device as a first driving voltage is supplied to the driving device upon reading the information recorded on the information record surface, the first driving voltage including such a value that the action of the clamping device is not linked with the movement of the reading device by the linkage device.

According to the information reproducing apparatus of the present invention, a DVD or the like as one example of the recording medium can be clamped by the clamping device. Then, the clamped DVD can be reproduced by rotating the DVD or the like with the rotating device and by reading the information recorded on the information record surface thereof with the reading device. Incidentally, according to the present invention, the reading device is moved by the driving device in the radial direction of the DVD or the like. Such a movement of the reading device can be controlled depending on the magnitude of the voltage applied to the driving device. More concretely, as the voltage applied to the driving device becomes the greater, the movement of the reading device becomes the more dynamic.

Particularly, according to the present invention, the linkage device is provided for operatively linking the clamping device with the reading device and the driving device. Herein, the clamping device and the linkage device may preferably include a clamping pawl, a spring and a clamping pawl actuating lever, as in one aspect of the invention (discussed later in detail). According to this linkage device, for example, by moving the reading device inwardly in the radial direction of the DVD, the forces or displacement to cause the movement is transmitted to the linkage device and the clamping device, resulting in the clamp-releasing of the DVD. Alternatively, it is possible to clamp the DVD by moving the reading device outwardly in the radial direction of the DVD.

Further, according to the present invention, upon reading the information recorded on the information record surface (i.e. the DVD reproduction), the driving device drives the reading device at the first driving voltage supplied to the driving device. The first driving voltage has a value that allows no linkage between the movement of the reading device and the action of the clamping device. That is, it is possible to prevent the clamp-releasing action by the clamping device via the linkage device while the driving device is driven at the first driving voltage. More concretely, for example, even in the case that the tracking error signal cannot be detected during the DVD track search due to an external disturbance such as a vibration otherwise a scratch or flaw on the DVD surface and thereby the optical pickup moves inwardly in the radial direction of the DVD and reaches the point allowing the operative linkage between the optical pickup and the clamping pawl, the clamp-releasing can be hardly actuated. This owes to the fact that the movement of the optical pickup can be controlled by the driving device according to the present invention depending on the magnitude of the voltage supplied thereto, as previously mentioned.

Thus, according to the information reproducing apparatus of the present invention, it is possible to prevent the operative linkage between the reading device and the clamping device at the time of reproducing the DVD or the like, resulting in that the clamp-releasing action is hardly likely to be performed during the reproduction. Therefore, according to the present invention, the rotational movement can be maintained securely and it is thereby possible to avoid the insecure reproduction process or any injury to the DVD.

In one aspect of the information reproducing apparatus according to the present invention, the driving device moves the reading device as a second driving voltage is supplied to the driving device upon performing the clamp-releasing action, the second driving voltage being greater than the first driving voltage, the second driving voltage having such a value that the action of the clamping device is linked with the movement of the reading device by the linkage device.

According to this aspect, upon reproducing the DVD or the like, the reading device is driven at the first driving voltage having the lower value, while, upon clamp-releasing the DVD, the reading device is driven at the second driving voltage having the higher value. Only in the case of the second driving voltage having the higher value, a series of operation (operative linkage) is actuated in the order from the driving device, the reading device, the linkage device and the clamping device. In this way, the clamping or clamp-releasing action for the DVD or the like by the clamping device can be advantageously performed.

In this aspect, the first and second driving voltages may respectively have one or more values in a predetermined range, and a lower limit of the one or more values in the predetermined range for the second driving voltage is greater than an upper limit of the one or more values in the predetermined range for the first driving voltage.

According to this aspect, for example, "the first driving voltage" may have a plurality of values $X1, X2, \ldots, Xn$ (wherein $X1<X2< \ldots <Xn$), each of which lies in a predetermined range, and "the second driving voltage" may have a value Y also in a predetermined range. During the reproduction of the DVD, since the reading device is required to move more freely, a plurality of values $X1, X2, \ldots, Xn$ set forth above are typically defined as the first driving voltage.

Particularly in the invention, the lower limit value in "the second driving voltage" is greater than the upper limit value in "the first driving voltage". That is, in the above example, Y is greater than X ($Y>Xn$). In this case, therefore, there is provided no range wherein the first driving voltage and the second driving voltage overlap with each another, and thus the control of the driving device is severely separated with both driving voltages. Thus, on supplying the first driving voltage to the driving device) there is little likelihood that the second driving voltage allowing the clamp-releasing is supplied to the driving device and thereby the farther secured rotational movement is obtained.

In another aspect of the information reproducing apparatus according to the present invention, the clamping device is provided with a clamping pawl capable of gripping an inner circumference of a hole formed at a center of the recording medium. The linkage device is provided with: a spring for applying pressure onto the clamping pawl in a direction to perform the clamping action; a clamping pawl actuating lever for transmitting a driving force, which is due to the movement of the reading device, to the clamping pawl, wherein the clamping pawl is urged to perform the clamp releasing action via the clamp pawl actuating lever by moving the reading device inwardly in the radial direction of the recording medium.

According to this aspect, the linkage device can be advantageously constructed. That is, in this way, for example, by moving the reading device inwardly in the radial direction of the DVD, the driving force can be transmitted to the clamping pawl via the clamping pawl actuating lever and thereby the clamping pawl can be displaced. Herein, it is possible to accomplish the clamp-releasing of the DVD (i.e. to disengage the clamping pawl gripping the inner circumference of the hole from the gripping position thereof), by matching the direction of this displacement with the counter-direction against the spring force (i.e. the counter-direction against the spring force biasing or applying pressure onto the clamping pawl so as to grip the inner circumference of a hole formed at the recording medium), in other words, by moving the reading device inwardly in the radial direction of the DVD. On the contrary, by moving the reading device from this position outwardly in the radial direction of the DVD, the DVD is automatically clamped (i.e. the inner circumference of the hole is gripped by the clamping pawl) via the spring force.

In short, according to this aspect, the DVD is clamped automatically in the normal position, and is disengaged from the clamping position by the movement of the reading device inwardly in the radial direction of the DVD to actuate the clamping pawl actuating lever and the clawing pawl via the operative linkage. Such an operation meets the requirement that the DVD needs to be clamped during the reproduction and that the reading device needs to move freely in the radial direction of the DVD. Thus, the linkage device according to this embodiment is one of the preferable modes.

In this aspect, there may be preferably provided a certain clearance between the limit position of the reading device allowable toward the inner circumference of the DVD 100 during the reproduction thereof and the position of the reading device allowing the clamp-releasing to be started (i.e. the clamping pawl begins moving). In this case, the inwardly limit position may be defined as the home position.

In another aspect of the information reproducing apparatus according to the present invention, the information reproducing apparatus is further provided with: an insert/eject commanding device for giving a command to insert/eject the recording medium into/from the information reproducing apparatus, wherein an operation of switching from the first driving voltage to the second driving voltage is executed in response to the command from the insert/eject commanding device.

According to this aspect, for example, if the insertion/ejection of the DVD is ordered via the insert/eject commanding device, i.e. more concretely, if the inserteject commanding device is used to insert the DVD into the information reproducing apparatus or to eject out the DVD already loaded in the information reproducing apparatus, the voltage to be supplied to the driving device is switched from the first driving voltage to the second driving voltage. In other words, for the former case, in order to insert the DVD, the clamping pawl is displaced to the non-obstructive position i.e., the clamp-releasing action is executed. For the latter case, in order to eject out the DVD, the clamp-releasing action is executed as well. Thus, according to this aspect, the information reproducing apparatus with improved operability can be provided, since the clamp-releasing is automatically operated in response to the command from the injection/ejection commanding device.

In another aspect of the information reproducing apparatus according to the present invention, the apparatus is further provided with: a limiter circuit for preventing a voltage, which has a value in excess of a predetermined value in the first driving voltage, from being supplied to the driving device.

According to this aspect, owing to the limiter circuit, the first driving voltage that particularly has the value in excess of the predetermined value is not be supplied to the driving device. Therefore, by presetting an appropriate value as the predetermined value, preferably as the value not exceeding the second driving voltage in magnitude, the above-mentioned effect of the present invention can be further ensured, because the voltage capable of actuating the clamp-releasing action is not be supplied to the driving device during the reproduction process of the DVD.

On the other hand, such a construction is preferable as the construction for preventing the clamp-releasing during the DVD reproduction process, in view of the fact that the voltage including various values is typically supplied to the driving device, in order to move the reading device more freely when the information on the information record surface is read (i.e. during the DVD reproduction). Namely, in case that the voltage with the value in excess of the preset value A is ready to be supplied on supplying such a voltage with various values, it is possible to supply only the voltage with the preset value A at the most to the driving device by means of the limiter circuit. Thus, in this embodiment, there is less likelihood that the clamp-releasing will happen during the DVD reproduction.

Incidentally, by employing the limiter circuit, it is possible to define the voltage with the value at or below the preset value A as "the first driving voltage" and the voltage with the value above the preset value A as "the second driving voltage", wherein the preset value A is a value already preset in the limiter circuit.

In another aspect of the information reproducing apparatus according to the present invention, the information reproducing apparatus further provided with: a servo control microcomputer and a clamping control microcomputer both for controlling the action of the driving device, wherein the driving device is controlled by the servo control microcomputer in case of supplying the first driving voltage to the driving device, the driving device is controlled by the clamping control microcomputer in case of supplying the second driving voltage to the driving device.

According to this aspect, there are provided microcomputers specifically arranged for controlling the driving device in each case of the DVD reproduction (using the first driving voltage) and the DVD clamp-releasing (using the second driving voltage), and thereby the information reproducing apparatus can be operated much more efficiently.

In another aspect of the information reproducing apparatus according to the present invention, the apparatus is for on-vehicle use.

According to this aspect, since the apparatus is for on-vehicle use, the use under the severe vibrational environment is expected, and thereby it is more likely that the clamp-releasing during the DVD reproduction will happen. Particularly, it is remarkable in the case that the car runs through a bad road.

Nevertheless, according to the present invention, the different voltages, i.e. the first driving voltage and the second driving voltage as mentioned before are supplied to the driving device on the DVD reproduction or the DVD clamp-releasing and thereby the likelihood that the clamp-releasing will happen during the DVD reproduction can be extremely reduced. Therefore, the information reproducing apparatus for the on-vehicle use in this embodiment is an advantageous aspect capable of receiving the merit and advantage specific to the present invention.

The above object of the present invention can be also achieved by a drive control system for controlling a driving device connected with a reading device to move the reading device in a radial direction of a recording medium, the reading device being capable of reading information recorded on an information record surface of the recording medium clamped by a clamping device and being operatively linkable with an action of the clamping device, wherein the driving device is actuated to move the reading device as a first driving voltage is supplied to the driving device upon reading the information recorded on the information record surface, the first driving voltage including such a value that the action of the clamping device is not linked with the movement of the reading device.

The drive control system according to the present invention constitutes substantially a part of the above described information reproducing apparatus of the present invention.

According to such a drive control system, it is obvious that the similar merit or effect is obtained as discussed previously. That is, when a DVD as one example of the recording medium is reproduced, the first driving voltage allowing no operative linkage with the clamping device is supplied to the driving device, and thereby the likelihood of the clamp-releasing during the DVD reproduction can be considerably reduced.

The above object of the present invention can be also achieved by a method of driving a driving device connected with a reading device to move the reading device in a radial direction of a recording medium, the reading device being capable of reading information recorded on an information record surface of the recording medium clamped by a clamping device and being operatively linkable with an action of the clamping device, wherein the driving device is actuated to move the reading device as a first driving voltage is supplied to the driving device upon reading the information recorded on the information record surface, the first driving voltage including such a value that the action of the clamping device is not linked with the movement of the reading device.

According to the information reproducing method of the present invention, the information reproducing apparatus according to the present invention can be advantageously operated.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The present invention will be described with the preferred embodiments, referring to the drawings. In the following embodiments, the information reproducing apparatus of the present invention is applied to a DVD player.

Figure 1:
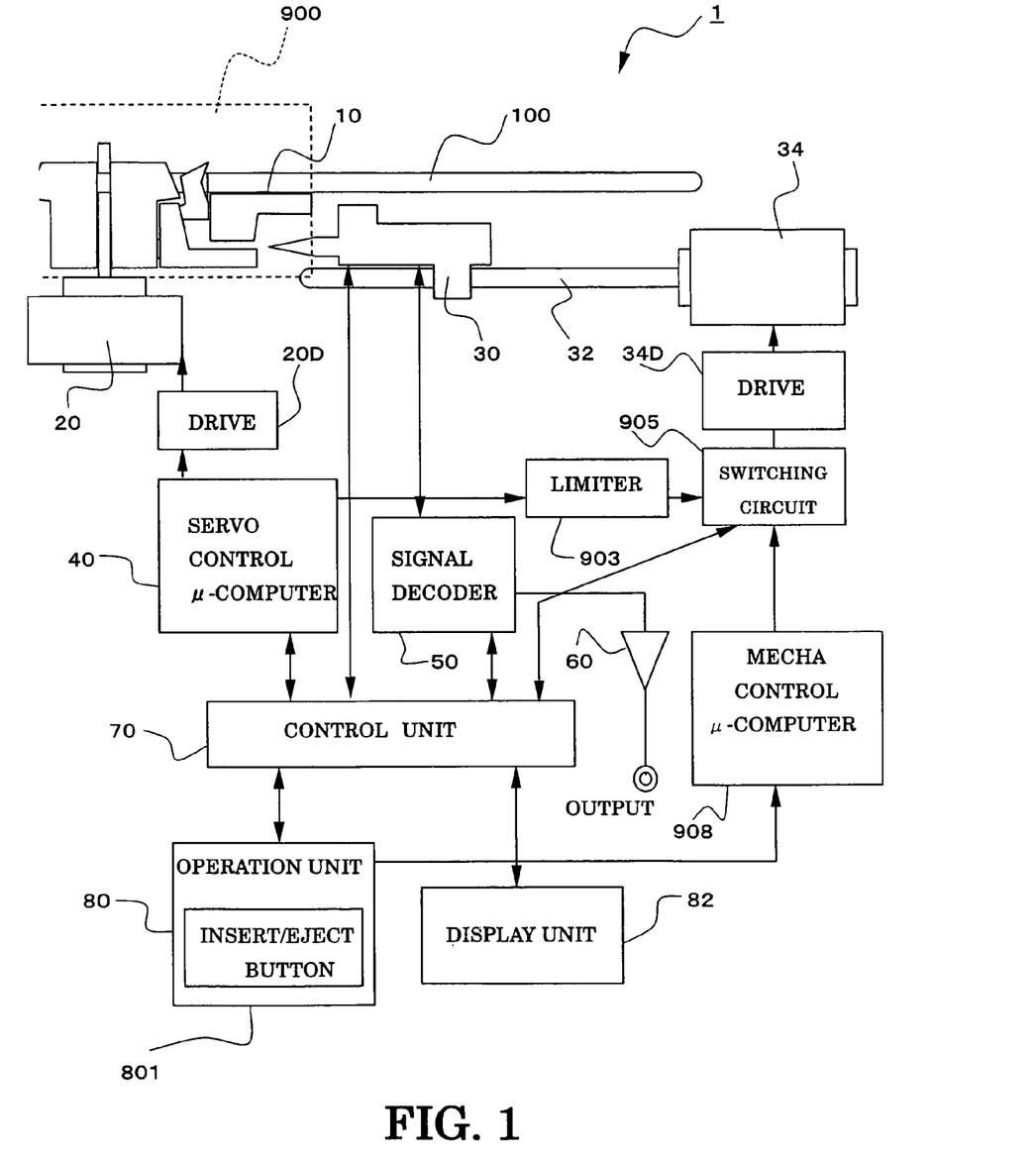
FIG. 1 is a schematic block diagram illustrating an entire configuration of a DVD player according to an embodiment of the present invention.

First, the outline of the DVD player according to the present embodiment will be discussed, referring to FIG. 1 to FIG. 5. FIG. 1 illustrates the outline configuration of the DVD player, while FIG. 2 to FIG. 5 illustrate the structure of the disc clamp mechanism as component of the DVD player.

In FIG. 1, a DVD player 1 for reproducing contents information recorded on a DVD 100 is provided with: a spindle motor 20 concentrically aligned with the DVD 100 loaded into the DVD player 1; an optical pickup 30 arranged movably along the lower surface, as seen in the figure, of the DVD 100; a pickup slider 32 and a carriage motor 34 for driving the optical pickup 30; a servo control microcomputer ($\mu$-computer) 40 electrically connected to the spindle motor 20 and the carriage motor 34; and a control unit 70 for the operation with each of these components under a systematic control, These components will now be discussed below, respectively.

The spindle motor 20 is provided with a table 10, at one end of the shaft thereof, for disposing the DVD 100 thereon, and functions to rotate the table 10 together with the DVD 100 disposed thereon. The carriage motor 34 is provided with the pickup slider 32, such as a ball screw, along the axis thereof and provided with the pickup 30 arranged so as to be driven by the pickup slider 32, and the carriage motor 34 functions to move the pickup 30 along the lower surface, as seen in the figure, of the DVD 100 as well as in the direction radial to the DVD 100. It is noted that the pickup 30 is provided with a semiconductor laser, a photodetector and the like, which are not shown in the figure. The semiconductor laser irradiates a laser beam onto the lower surface, as seen in the figure, of the DVD 100, and the photodetector detects the reflection light and obtains information for decoding an array of pits on the lower surface, as seen in the figure, of the DVD 100, and transforms such obtained information into an electric signal.

The servo control microcomputer 40 servo controls the spindle motor 20 and the carriage motor 34 via the drive unit 20D and the drive unit 34D of respective motors. In other words, depending on the position of the contents information to be reproduced, the rotational speed of the DVD 100 is controlled appropriately (e.g. slowly near the outer circumference of the DVD, quickly near the inner circumference of the DVD by controlling the spindle motor 20, while the radial position of the pickup 30 is determined appropriately by controlling the carriage motor 34. Incidentally, the servo control microcomputer 40 controls the carriage motor 34 via a limiter circuit 903 and a switching circuit 905 in addition to the drive unit 34D, as shown in FIG. 1. This will be discussed in detail later.

Particularly in this embodiment, a disc clamp mechanism 900 operatively linked with the pickup 30 is provided. As illustrated in FIG. 2 to FIG. 5, the disc clamp mechanism 900 broadly includes a clamping pawl 81, springs 83 (this numeral "83" may be used for the general designation including the numeral "83a" or "83b"), and a clamping pawl actuating lever 85 (hereinafter merely referred to as "actuating lever 85") and others. These essential components and associated sub-components will be explained in detail below.

Figure 2:
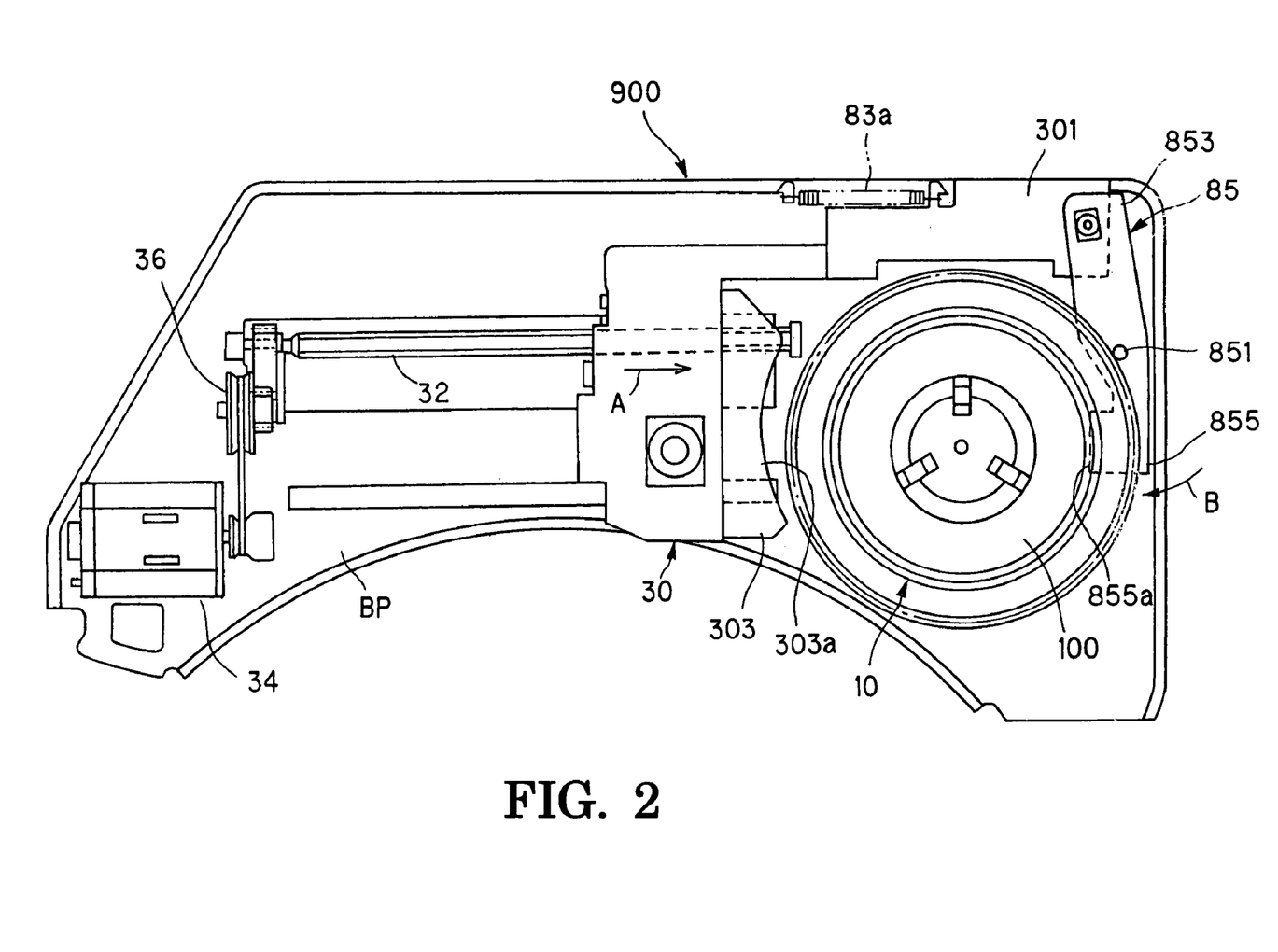
FIG. 2 is a plan view illustrating an entire configuration of a disc clamp mechanism of the DVD player in FIG. 1.
Figure 3:
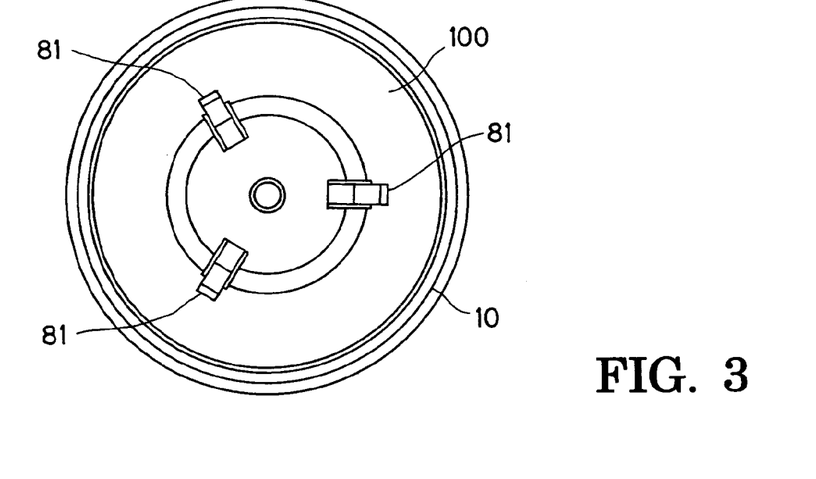
FIG. 3 is a plan view particularly showing clamping pawls and a table with a DVD disposed thereon in the disc clamp mechanism in FIG. 2.
Figure 4:
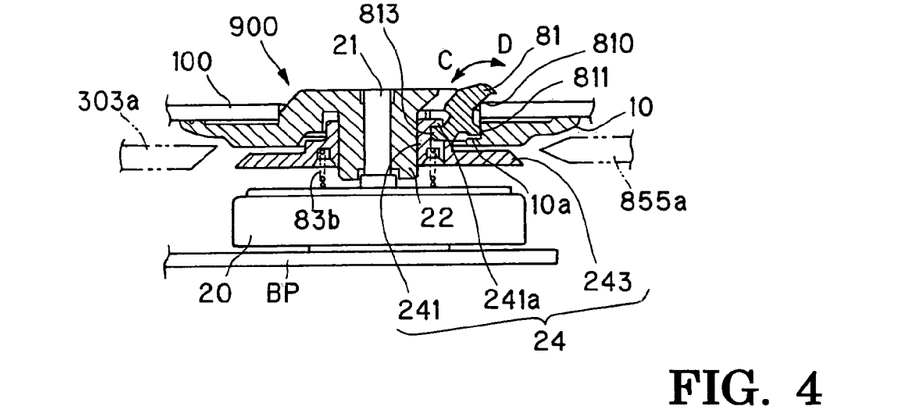
FIG. 4 is a sectional view of the disc clamp mechanism in FIG. 2, in a condition of clamping the DVD at a normal position (i.e. at the time of reproduction).

The clamping pawl 81 is operative to hold the DVD 100 by damping the inner circumference of the hole provided at the center of the DVD 100. In this embodiment, the clamping pawl 81 has three pawl members, which are identical in their shape and are arranged so as to be evenly spaced from each other around the inner circumference of the hole, as shown in FIG. 2 and FIG. 3. Each pawl member is operative as a kind of lever, which has a grip portion 810, a fulcrum portion 811 and a load point portion 813. The grip portion 810 is operative to hold the DVD 100 by directly contacting with the inner circumference of the DVD hole. The fulcrum portion 811 is operative to abut onto the inner circumference of a hole formed at the center of the table 10 as shown in FIG. 4. A lower edge portion of the fulcrum portion 811 in the figure is able to abut onto a shoulder 10a extending from the inside circumferential surface of the table 10 (see FIG. 5). On the other hand, the load point portion 813 abuts onto a power transmission block 24, which is disposed around the housing 22 surrounding the driving shaft 21 of the spindle motor 20 (more particularly, the load point portion 813 abuts onto the flange 241a as mentioned below). The housing 22 is formed as an integral part of the table 10.

Figure 5:
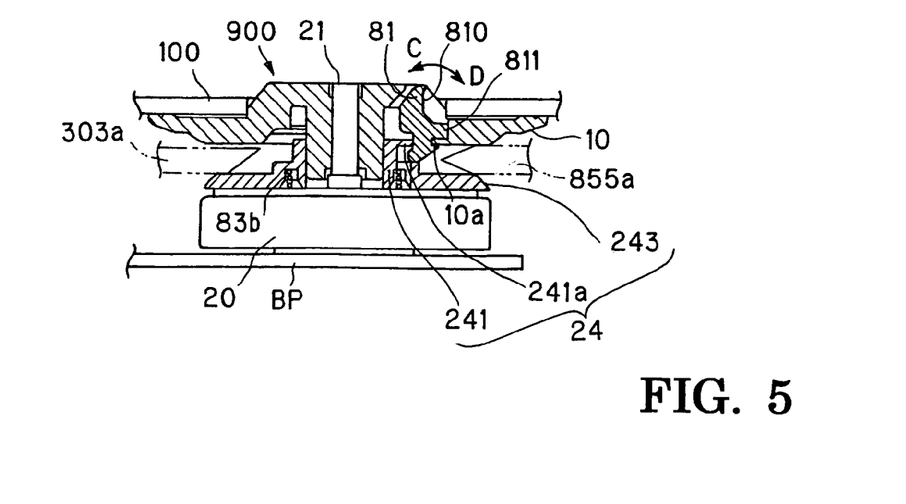
FIG. 5 is a sectional view of the disc clamp mechanism in FIG. 2, in a condition of clamp-releasing the DVD.

Now referring to FIG. 4 and FIG. 5, the power transmission block 24 includes: a cylindrical portion 241, whose inside circumferential surface slidably abuts on the outside circumferential surface of the housing 22; and a planar portion 243 radially extending from the lower edge portion, as seen in the figure, of the cylindrical portion 241. That is, the power transmission block 24 has the sectional shape like that of a silk hat. A flange 241a is provided at the top end, as seen in the figure, of the cylindrical portion 241, and the flange 241a abuts on the load point portion 813 of the clamping pawl 81. In a normal status or position (i.e. at a status shown in FIG. 4 during the reproduction of the DVD 100, as discussed later), a certain clearance is ensured between the top surface, as seen in the figure, of the planar portion 213 and the bottom surface, as seen in the figure, of the table 10. Between the bottom edge portion, as seen in the figure, of the power transmission block 24 and a base surface BP, there is a spring 83b by which an elastic force directed upward in the figure is always applied onto the power transmission block 24.

On the other hand, the actuating lever 85 is formed in a substantially rectangular shape, whose whole plane shape is flattened, and has a hinge 851 at an approximately center portion thereof, as shown in FIG. 2. The actuating lever 85 is arranged to rotate around the hinge 851 in the direction shown by an arrow B in FIG. 2. As shown in FIG. 2, a leading edge of a rod 301 extended from the pickup 30 is rotatably connected to the proximal end 853 of the actuating lever 85. A tab 855a having a sharpened edge is provided at the side surface of the substantially rectangular shape near the distal end of the actuating lever 85, in such a manner that the tab 855a is interposed in the clearance between the top surface of the planar portion 243 of the power transmission block 24 and the bottom surface of the table 10. Suspended in the rod 301 is a spring 83a, by which a tension leftward, as seen in the figure, is always applied to the rod 301. This tension is also applied to the actuating lever 85, and since the actuating lever 85 and the rod 301 is rotatably connected as set forth above, the tension acts to draw the proximal end 853 of the actuating lever 85 leftward, as seen in the figure, and draw the tab 855a rightward, as seen in the figure. That is, as shown in FIG. 4, the tab 855a is not interposed between the top surface of the planar portion 243 and the lower surface of the table 10, in normal position.

Similarly to the tab 855a of the actuating lever 85 as set forth above, a projection 303 with a tab 303a having the acute angle in the section is provided at a surface of the pickup 30 which is opposite the DVD 100. The tab 303a at the projection 303 is able to be inserted into the clearance between the top surface, as seen in the figure, of the planar portion 243 of the power transmission block 24 and the bottom surface, as seen in the figure, of the table 10 by moving the pickup 30 in the direction shown by an arrow A in FIG. 2, as shown in FIG. 2 otherwise FIG. 4 and FIG. 5, It is noted that the inserting direction of the tab 303a is just opposite to the inserting direction of the tab 855a of the actuating lever 85.

Incidentally, the pickup 30 is arranged to be movable in the radial direction of the DVD 100 by the pickup slider 32 and the carriage motor 34. FIG. 2 shows the construction of these components in detail. That is, a ball screw as the pickup slider 32 is threaded into the inside of the housing of the pickup 30, and the ball screw as the pickup slider 32 is connected, at the left edge thereof, as seen in the figure, to the driving shaft of the carriage motor 34 via an appropriate gear or pulley 36. Additionally, a fixed shaft arranged parallel to the ball screw is inserted inside of the housing of the pickup 30. In this arrangement, the rotation of the carriage motor 34 forces the ball screw as the pickup slider 32 to rotate and thereby forces the pickup 30 to move to and fro. This is because the fixed shaft restricts the rotation of the pickup 30 backward or forward against the plane of the figure.

Now, in the disc clamp mechanism 900 arranged as set forth above, the driving force due to the motion of the pickup 30 is transmitted to the clamping pawl 81 via the actuating lever 85, and this transmission allows the clamping or clamp-releasing operation for the DVD 100. That is, in a normal position, as shown in FIG. 4, the tab 855a of the actuating lever 85 and the tab 303a provided at the projection 303 of the pickup 30 are in the position apart from the top surface of the planar portion 243 of the power transmission block 24 and the bottom surface of the table 10. Therefore the clamping pawl 81 grabs the inner circumference of the central hole of the DVD 100 owing to the force exerted by the spring 83. In other words, the DVD 100 is in a clamped position.

On the other hand, referring to FIG. 5, from the position set forth above, by moving the pickup 30 rightward, as seen in the FIG. 2, the rod 301 moves in the direction opposite to the force exerted by the spring 83a and simultaneously pushes the proximal end 853 of the actuating lever 85 rightward in FIG. 2. Thus, the actuating lever 85 becomes rotating about the hinge 851 in the direction shown by the arrow 3B. Therefore, the tab 855a moves to be inserted into the clearance between the top surface of the planar portion 243 of the power transmission block 24 and the bottom surface of the table 10. Simultaneously, the tab 303a provided at the projection 303 of the pickup 30 also moves to be inserted into the clearance between the top surface of the planar portion 243 and the bottom surface of the table 10.

Thereupon, as seen in the transition from FIG. 4 to FIG. 5, as the tab 855a and the tab 303a advance, the power transmission block 24 moves into the direction opposite to the force exerted by the spring 83b, i.e. downward in the figure. As a result, the flange 241a at the top end of the cylindrical portion 241 of the power transmission block 24 pushes the load point portion 813 of the clamping pawl 81 to move downward in the figure. Simultaneously, the table 10 is pushed upward, as seen in the figure, thereby kicking up the fulcrum portion 81 of the clamping pawl 81 to move upward in the figure. This movement arises simultaneously among three pawl members of the clamping pawl 81.

Thus, the grip portion 810 of the clamping pawl 81 moves to disengage themselves from the inner circumference of the hole formed at the center of the DVD 100 (see an arrow C in FIG. 4 and FIG. 5). That is, the DVD 100 is disengaged from the clamped position.

As discussed above, in the disc clamp mechanism 900 according to the present invention, the pickup 30 and the clamping pawl 81 are arranged to operate cooperatively such that the engagement (clamping) or disengagement of the DVD 100 is possible depending on the movement of the pickup 30.

Furthermore, there is preferably provided a predetermined clearance between (i) such a position of the pickup 30 where the disengaging movement starts (i.e. the clamping pawl 81 starts moving) and (ii) a limit position of the pickup 30 movable toward the inner circumference of the DVD 100. In this embodiment, the movable limit position is defined as the home position.

Additionally, in this embodiment, there are also provided two kinds of driving voltage to be supplied to the carriage motor 34 as the power source for driving the pickup 30. To accomplish this, in this embodiment, as shown in FIG. 1, both of the servo control microcomputer 40 set forth above and a mechanical control microcomputer (a mecha control μ-computer) 908 connected to an operation unit 80 as discussed later are connected, via a switching circuit 905, to the drive unit 34D operative to supply the driving voltage to the carriage motor 34. The drive unit 34D is controlled by both control microcomputers 40 and 908. Particularly, in this embodiment, a limiter circuit 903 is disposed between the switching circuit 905 and the servo control microcomputer 40.

For the above discussion, the mechanical control microcomputer 908 is a control unit used for the purpose of controlling the movement of the disc clamp mechanism 900, which is in the complementary relationship with the servo control microcomputer 40 (i.e. when one is in operation, the other is out of operation). Further, the drive unit 34D supplies the clamping voltage (corresponds to "the second driving voltage" according to the present invention) to the carriage motor 34 under the control by the mechanical control microcomputer 908, or supplies the servo control voltage (corresponds to "the first driving voltage" according to the present invention) to the carriage motor 34 under the control by the servo control microcomputer 40. It is noted that the clamping voltage is greater than the servo control voltage. Such voltages are switched in such a manner that the command from the servo control microcomputer 40 or the mechanical control microcomputer 908 is transmitted to the drive unit 34D via the switching circuit 905 operative to switch the transmission line of a command from the control unit 70. The operation or action of the disc clamp mechanism 900 and these components will be discussed again in relation to the explanation of the operative embodiments of the DVD player 1 set forth below.

On the other hand, the limiter circuit 903 is operative to break a command, which is sent from the servo control microcomputer 40, to supply the voltage above the predetermined value from the drive unit 34D, before the command reaches the drive unit 34D, Practically, the limiter circuit 903 prevents the driving voltage from the drive unit 34D under the control of the servo control microcomputer 40, i.e. the servo control voltage, above the predetermined value from being supplied to the carriage motor 34. The predetermined value herein is preferably selected as a value in a range between the servo control voltage and the clamping voltage.

Now, in addition to the above components, the DVD player 1 according to this embodiment includes a signal decoder circuit 50 and an audio output circuit 60. The signal decoder circuit 50 decodes an electric signal from a photodetector of the pickup 30. Then the audio output circuit 60 outputs sound by driving one or more speakers according to the decoded electric signal. Thus, the DVD player 1 according to the present invention is arranged for reproducing a so-called "DVD-A (DVD-Audio)". It is noted that an apparatus for reproducing a so-called "DVD-V (DVD-Video)" capable of video output as well as the DVD player 1 capable of audio output is encompassed within the "information reproducing apparatus" according to the present invention. In this case, a video output circuit may be additionally provided in FIG. 1.

The control unit 70 makes these components operative cooperatively. As shown in FIG. 1, an operation unit 80 and a display unit 82 are also connected to the control unit 70. The operation unit 80 is provided with various buttons such as a play button, a fast-forward and back-feed button, or a skip-search button, for supplying the desired command of the user to the DVD player 1. Particularly in this embodiment, an insert/eject button 801 for giving the command of inserting or ejecting the DVD 100 into or from the DVD player 1 is equipped in the operation unit 80. On the other hand, the display unit 82 is provided with, for example, a LCD (Liquid Crystal Display), for monitoring the condition of the DVD player 1 (e.g. "play mode" or "user input waiting mode"), otherwise for indicating the result from the operative input via the operation unit 80 to the user. In some cases, the operation unit 80 and the display unit 82 may be arranged as one unit for both purposes of operation and display by employing a touch panel type of LCD and the like.

Figure 6:
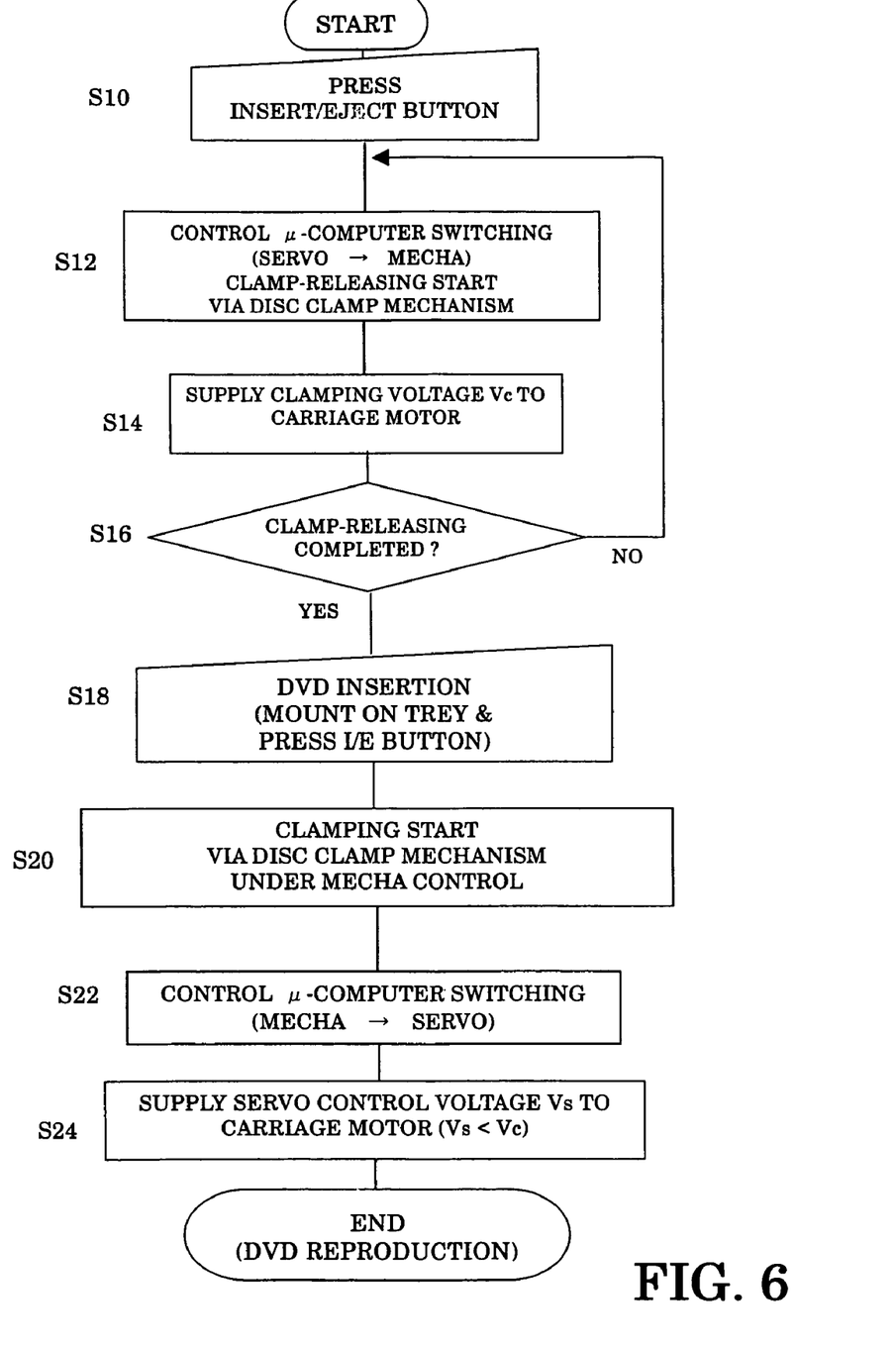
FIG. 6 is a flow chart showing a process performed upon inserting the DVD into the DVD player according to the embodiment of the present invention.
Figure 7:
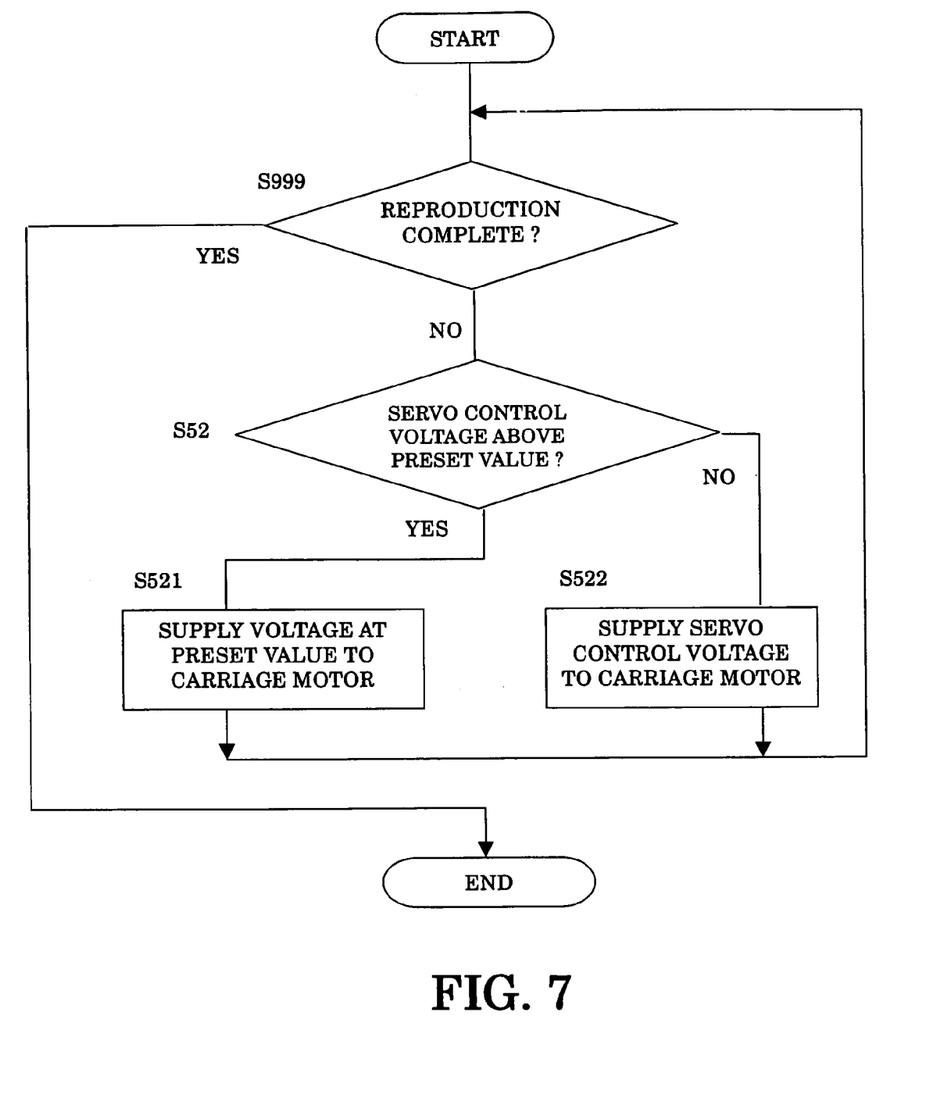
FIG. 7 is a flow chart showing a process of the DVD reproduction process in the DVD player according to the embodiment of the present invention.

Now an operative embodiment of the DVD player 1 arranged as such, particularly the operative embodiment of the disc clamp mechanism 900, will be discussed, with referring to FIG. 6 and FIG. 7. FIG. 6 is a flow chart illustrating the process flow in an inserting step of the DVD 100 into the DVD player 1. FIG. 7 is a flow chart illustrating the process flow in the DVD reproduction step.

Referring to FIG. 6, first, the user presses down the inserteject button 801 in the operation unit 80 so that the DVD 100 is inserted into the DVD player 1 (step S10). For this, there have been provided several types of inserting modes such as a horizontal type for mounting the DVD 100 on a trey, a vertical type for inserting the DVD 100 into a slit provided at the DVD player, and so forth. Although the present invention may employ essentially all types, the horizontal type is herein taken as an exemplary embodiment for the discussion below.

As previously explained, once the insert/eject button 801 is pressed, the DVD player 1 will eject the trey (not shown) for mounting the DVD 100 thereon. Simultaneously, the process as follows is executed in the disc clamp mechanism 900.

Once the insert/eject button 801 is pressed down, the control unit 70 starts controlling the clamp-releasing action involving the pickup 30, the carriage motor 34, the disc clamp mechanism 900 and the like via the mechanical control microcomputer 908 (step S12). That is, the control unit 70 gives a switching command to the switching circuit 905 so that the drive unit 34D is controlled by the mechanical control microcomputer 908. Thereby, the clamping voltage is supplied to the carriage motor 34 (step S14).

Thereby, the carriage motor 34 driven at the clamping voltage moves the pickup 80 inwardly in the radial direction of the DVD 100 (strictly speaking, however, the DVD 100 is not mounted on the trey at this time, therefore the expression "inwardly in the radial direction of the DVD 100" in this context is to be interpreted as "inwardly in the radial direction of the DVD 100, if the DVD is on the trey") Once the pickup 30 reaches the point beyond the home position, the disc clamp mechanism 900 performs the clamp-releasing action according to the movement of the pickup 30. That is, against the force exerted by the spring 83*a*, the rod 301 attached to the pickup 30 pushes the proximal end 853 of the actuating lever 85 rightward in the figure and pulls the distal end 855 leftward in the figure.

Thereby, the tab 855a formed at the distal end 855 is inserted into the clearance between the top surface of the planar portion 243 of the power transmission block 24 and the bottom surface of the table 10. Similarly and simultaneously, the tab 303a at the projection 303 of the pickup 30 is also inserted into the clearance. By these insertions of the tabs 855a and 303a, the power transmission block 24 moves downward as seen in FIG. 4 and FIG. 5, pushes down (into the same direction as the descendant of the block 24) the load point portion 813 of the clamping pawl 81, while the shoulder 10a of the table 10 moves upward seen in the figures, kicking up (into the same direction as the rising of the table 10) the fulcrum portion 815 of the clamping pawl 81. Thereby, the clamping pawl 81 moves into the direction shown by the arrow C in FIG. 4 and FIG. 5, resulting in the clamp-releasing action being executed.

The clamp-releasing action is continued until the positive completion of the action is ensured, as shown in the step S16 of FIG. 6. Such a confirmation may be easily carried out by disposing a sensor at the appropriate position in the space where the power transmission block 24, the actuating lever 85 and the clamping pawl 81 sweep, and monitoring the output from the sensor; alternatively may be carried out by monitoring the predetermined elapsed time.

On the other hand, in the time range from the beginning of the clamp-releasing action to the completion thereof, the DVD player 1 ejects the trey. The user mounts the DVD 100 on the ejected trey and pushes down the insert/eject button 801 to insert the trey into the inside of the DVD player 1 (step S18). It is noted that the insertion of the DVD 100 into the DVD player 1 is not limited to this embodiment but can be embodied in various modes (e.g. an insertion of the trey by pressing down the play button).

In any case, receiving such an insertion command of the DVD 100 from the user, the control unit 70 verifies that the trey loading the DVD 100 thereon reaches the predetermined point, and then actuates the disc clamp mechanism 900 etc., via the mechanical control microcomputer 908. Opposite to the former case, now the pickup 30 is moved outward in the radial direction of the DVD 100. Thereby, accelerated by the springs 83a and 83b, the clamping pawl 81 acts in the opposite manner to the former case (i.e. the movement in the direction shown by the arrow D in FIG. 4 and FIG. 5). That is, the inserted DVD 100 is clamped (step S20). In this case, there is no need for detecting the completion of the action (step S20) as performed in the clamp-releasing action. This is because the clamping position of the clamping pawl 81 for clamping the DVD 100 is automatically adjusted depending on the magnitude of the elastic force of the springs 83a and 83b.

Thus, on completing the clamp action of the DVD 100, the control unit 70 then switches the control to the drive unit 34D: from the mechanical control microcomputer 908 to the servo control microcomputer 40 (step S22). Thereby, the servo control voltage is supplied to the carriage motor 34 (step S24). It is noted that the value of this servo control voltage is lower than that of the clamping voltage, and thus the actuating lever 85, the clamping pawl 81 and others in the disc clamp mechanism 900 are not actuated at the value of the servo control voltage. That is, when the drive unit 34D is under the control of the servo control microcomputer 40, the clamp-releasing action of the DVD 100 is not performed.

After these processes as set forth above has been completed, the normal reproduction process of the DVD is started (step END). That is, the control unit 70 controls the movement of the carriage motor 34 and the pickup 30 via the servo control microcomputer 40 and starts servo controlling the spindle motor 20 to rotate the DVD 100. In this reproduction process of the DVD 100, the pickup 30 moves between the home position (which is a limit position allowable toward the inner circumference of the DVD 100) and a limit position allowable toward the outer circumference of the DVD 100. Also started is the laser beam oscillation by the semiconductor laser as well as the photo receiving and the signal extraction by the photodetector provided for the pickup 30 and driving the audio output circuit 60 based on the obtained signal.

Incidentally, in this embodiment, during the reproduction process of the DVD, the limiter circuit 903 is actuated. That is, as shown in the step S522 of the FIG. 7, the servo control voltage with various values is supplied to the carriage motor 34 as appropriate: the limiter circuit 903 always monitors the servo control voltage with the value in excess of the preset value therein to prevent the voltage with the excessive value from being supplied to the carriage motor 34 (step S52). Strictly speaking, however, the substantial object of monitoring is not the value itself but the command from the servo control microcomputer 40 that commands to supply the voltage with the value in excess of the preset value from the drive unit 34D to the carriage motor 34 (see FIG. 1), resulting in such a command being blocked. If the servo control voltage with the value in excess of the preset value is about to be supplied (step S52: YES), then the limiter circuit 903 supplies the voltage with the preset value to the carriage motor 34 instead of supplying the voltage with excessive value (step S521). On the other hand, if the servo control voltage with the value in excess of the preset value is not about to be supplied (step S52: NO), the servo control voltage is supplied to the carriage motor 34 without being limited (step S522). These processes are to be continued until the reproduction of the DVD is completed (step S999).

Thus, according to the DVD player 1 of the present invention, if the clamp-releasing action in the disc clamp mechanism 900 is desired, the clamping voltage is supplied to the carriage motor 34 under the control of the mechanical control microcomputer 905, whereas during the reproduction process of the DVD, the servo control voltage only with values lower than that of the clamping voltage is supplied to the carriage motor 34 under the control of the servo control microcomputer 40. During the reproduction process of the DVD), since the limiter circuit 903 prevents the voltage with the value in excess of the preset value from being supplied to the carriage motor 34, the carriage motor 34 cannot actuate the pickup 80 for the clamp-releasing action.

Therefore, during the reproduction process of the DVD in this embodiment, there is almost no likelihood that the DVD 100 being clamped will be disengaged, thereby resulting in the stable rotation being maintained.

Particularly in this embodiment, it is noted that since the clamp-releasing action in the disc clamp mechanism 900 is actuated depending on the insert/eject button 801 in the operation unit 80 being pressed, there is no request to the user for the special operation, resulting in the DVD player with improved operability being provided.

Incidentally, the insertion of the DVD 100 into the DVD player 1 has been discussed (FIG. 6); it is obvious that the similar process is applicable to the ejection of the DVD 100 from the D)VD player 1. That is, for the ejection of the DVD 100, before the step S10 in the FIG. 6, the control of the carriage motor 34 and the spindle motor 20 by the servo control microcomputer 40 may be terminated, and in the step S18, "DVD ejection" may be executed, and the processes after the step S20 may be omitted. Also in this case, the clamp-releasing action is executed depending on whether the insert/eject button 801 is pressed.

Furthermore, in the above embodiment, the disc clamp mechanism 900 is controlled in its operation or action, depending on the pressing of the insert/eject button 801 in the operation unit 80. However, the present invention is not limited to such an embodiment. For instance, the operation unit 81 and the display unit 82 as shown in FIG. 1 are not necessarily to be employed, and thus a DVD player without the operation unit 81 and the display unit 82 is feasible. In this case, the clamp-releasing action may be executed at the insertion/ejection of the DVD into/from the DVD player, in which such an insertion/ejection is indispensable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No 2002-172569 filed on Jun. 13, 2002 including the specification, claims, drawings and summary is incorporated herein by reference in its entirety.

What is claimed is:

1. An information reproducing apparatus comprising:
  a clamping device capable of clamping and clamp-releasing a recording medium;
  a rotating device for rotating the recording medium clamped by said clamping device;
  a reading device disposed opposite to an information record surface of the recording medium for reading information recorded on the information record surface of the recording medium;
  a driving device capable of moving said reading device in a radial direction of the recording medium; and
  a linkage device for linking a clamping or clamp-releasing action by said clamping device with a movement of said reading device by said driving device,
  wherein said driving device moves said reading device as a first driving voltage is supplied to said driving device upon reading the information recorded on the information record surface, the first driving voltage including such a value that the action of said clamping device is not linked with the movement of said reading device by said linkage device.

2. The information reproducing apparatus according to claim 1, wherein said driving device moves said reading device as a second driving voltage is supplied to said driving device upon performing the clamp-releasing action, the second driving voltage being greater than the first driving voltage,
  the second driving voltage having such a value that the action of said clamping device is linked with the movement of said reading device by said linkage device.

3. The information reproducing apparatus according to claim 2, wherein the first and second driving voltages respectively have one or more values in a predetermined range, and
  a lower limit of the one or more values in the predetermined range for the second driving voltage is greater than an upper limit of the one or more values in the predetermined range for the first driving voltage.

4. The information reproducing apparatus according to claim 2, further comprising:
  an insert/eject commanding device for giving a command to insert/eject the recording medium into/from the information reproducing apparatus,
  wherein an operation of switching from the first driving voltage to the second driving voltage is executed in response to the command from said insert/eject commanding device.

5. The information reproducing apparatus according to claim 2, further comprising a servo control microcomputer and a clamping control microcomputer both for controlling the action of said driving device,
  wherein said driving device is controlled by said servo control microcomputer in case of supplying the first driving voltage to said driving device,
  said driving device is controlled by said clamping control microcomputer in case of supplying the second driving voltage to said driving device.

6. The information reproducing apparatus according to claim 1, said clamping device comprising a clamping pawl capable of gripping an inner circumference of a hole formed at a center of the recording medium,
  said linkage device comprising:
  a spring for applying pressure onto said clamping pawl in a direction to perform the clamping action;
  a clamping pawl actuating lever for transmitting a driving force, which is due to the movement of said reading device, to said clamping pawl,
  wherein said clamping pawl is urged to perform the clamp-releasing action via said clamp pawl actuating lever by moving said reading device inwardly in the radial direction of the recording medium.

7. The information reproducing apparatus according to claim 1, further comprising:
  a limiter circuit for preventing a voltage, which has a value in excess of a predetermined value in the first driving voltage, from being supplied to said driving device.

8. The information reproducing apparatus according to claim 1, wherein said apparatus is for on-vehicle use.

9. A drive control system for controlling a driving device connected with a reading device to move said reading device in a radial direction of a recording medium, said reading device being capable of reading information recorded on an information record surface of the recording medium clamped by a clamping device and being operatively linkable with an action of said clamping device,
  wherein said driving device is actuated to move said reading device as a first driving voltage is supplied to said driving device upon reading the information recorded on the information record surface, the first driving voltage including such a value that the action of said clamping device is not linked with the movement of said reading device.

10. A method of driving a driving device connected with a reading device to move said reading device in a radial direction of a recording medium, said reading device being capable of reading information recorded on an information record surface of the recording medium clamped by a clamping device and being operatively linkable with an action of said clamping device,
  wherein said driving device is actuated to move said reading device as a first driving voltage is supplied to said driving device upon reading the information recorded on the information record surface, the first driving voltage including such a value that the action of said clamping device is not linked with the movement of said reading device.

* * * * *